United States Patent [19]
Kume et al.

[11] Patent Number: 4,750,063
[45] Date of Patent: * Jun. 7, 1988

[54] FLOPPY DISK DRIVE HAVING A PIVOTALLY SUPPORTING CARTRIDGE CARRIER

[75] Inventors: Kazunari Kume, Saitama; Churyo Seki, Tokyo; Kunio Suganuma, Saitama; Hiroshi Kurafuji; Hiroshi Mabuchi, both of Tokyo; Hisao Wakabayashi, Saitama; Yoshiyuki Ohishi, Tokyo; Takayasu Machida, Saitama, all of Japan

[73] Assignee: Citizen Watch Co., Ltd., Tokyo, Japan

[*] Notice: The portion of the term of this patent subsequent to Aug. 11, 2004 has been disclaimed.

[21] Appl. No.: 612,867

[22] Filed: May 22, 1984

[30] Foreign Application Priority Data

May 23, 1983 [JP] Japan ................. 58-090414

[51] Int. Cl.⁴ ................. G11B 5/016; G11B 5/012
[52] U.S. Cl. ................. 360/99; 360/137
[58] Field of Search ................. 360/97, 99, 137, 96.5

[56] References Cited

U.S. PATENT DOCUMENTS

| | | | |
|---|---|---|---|
| 4,345,283 | 8/1982 | Maryschka | 360/137 |
| 4,466,032 | 8/1984 | Saito | 360/97 |
| 4,467,379 | 9/1984 | Itani | 360/137 |
| 4,517,617 | 5/1985 | Tsuji et al. | 360/99 |
| 4,546,397 | 9/1985 | Asami et al. | 360/99 |

FOREIGN PATENT DOCUMENTS 59-33666 2/1984 Japan ................. 360/99

Primary Examiner—Stuart N. Hecker
Assistant Examiner—Melissa J. Koval
Attorney, Agent, or Firm—Koda and Androlia

[57] ABSTRACT

The present invention provides a floppy disk drive which can removably receive a cartridge containing a floppy disk and which can travel a READ/WRITE head to the desired track on the floppy disk while rotating the floppy disk at a constant speed for effecting the desired read/write action under an electric-magnetic conversion. The drive is of a top-up type which includes a frame portion and a carrier which can be popped up from the frame portion. The frame portion includes a spindle motor for directly driving the floppy disk, a plurality of positioning pins for positioning the disk cartridge relative to the spindle motor, and a carriage carrying the READ/WRITE head for travelling the head to the desired track on the disk. The carrier is pivotably supported by the frame portion and adapted to receive the disk cartridge. The cartridge can be loaded into the lower portion of the carrier upon popping-up of the carrier. When the carrier is engaged by the frame, the cartridge is upwardly moved to a predetermined position within the carrier.

2 Claims, 15 Drawing Sheets

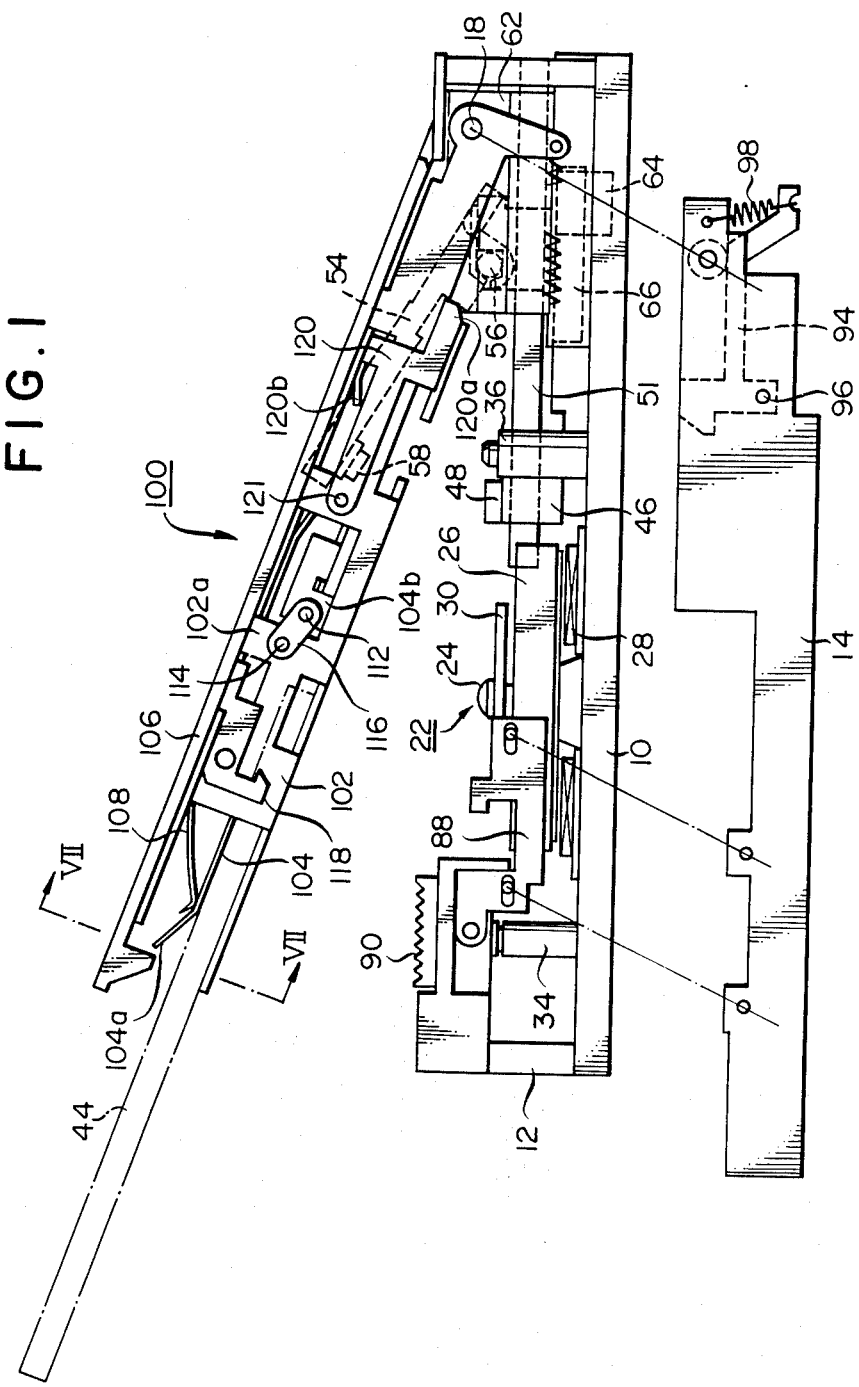

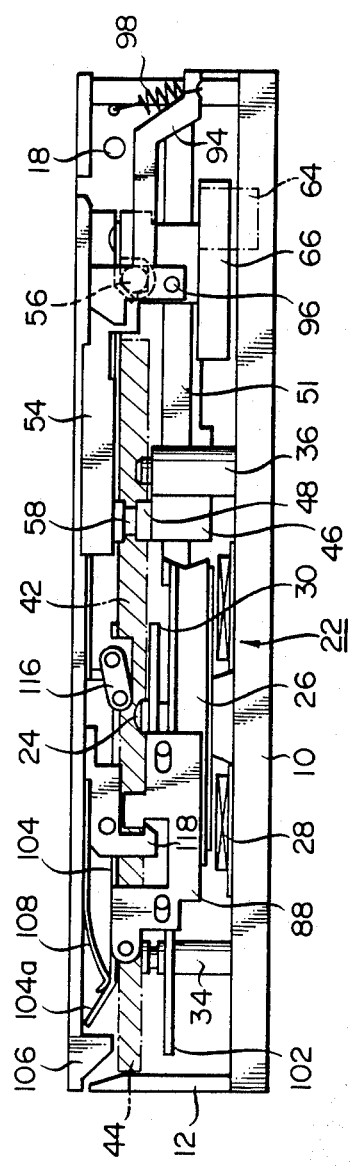
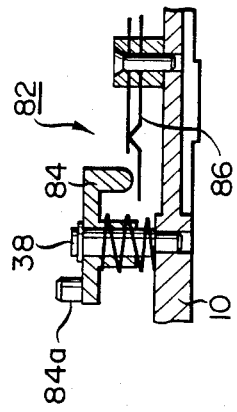
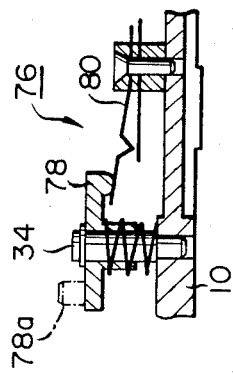

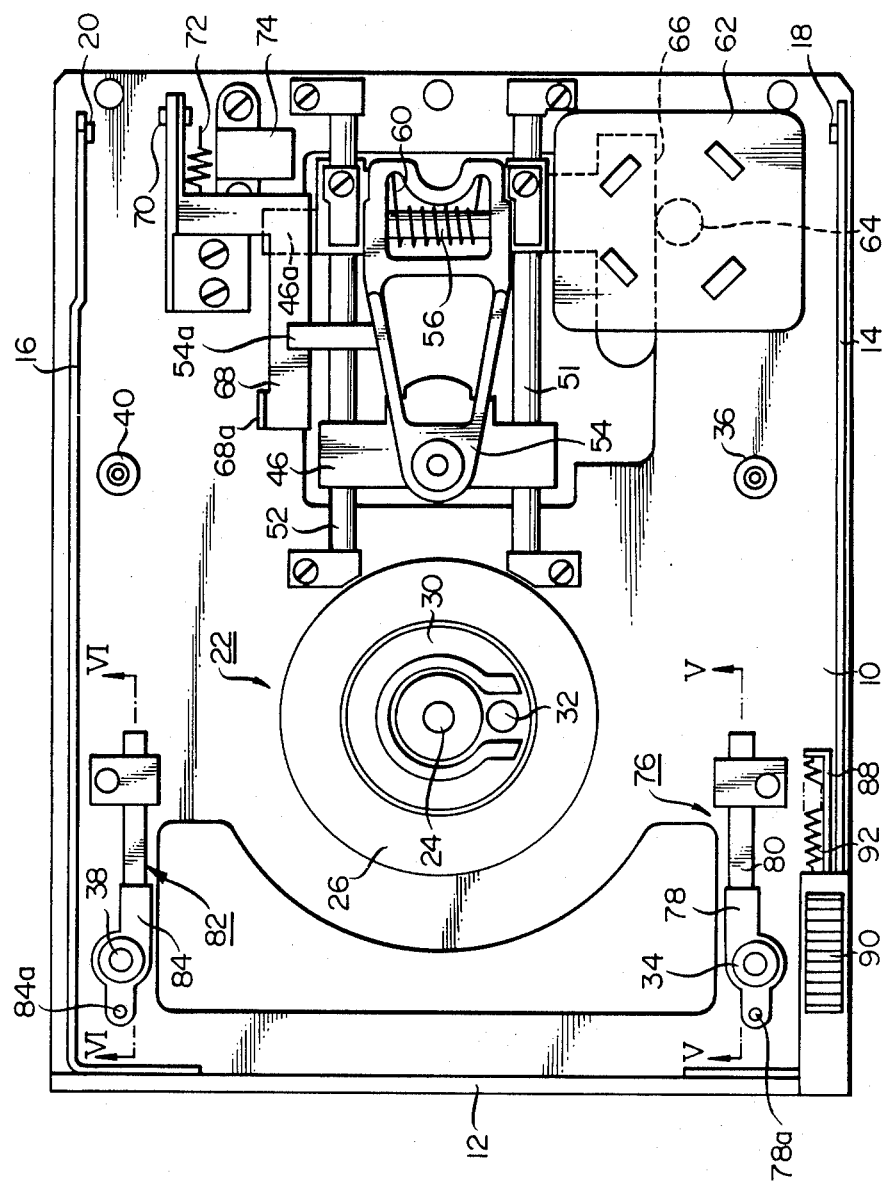
F I G. 3

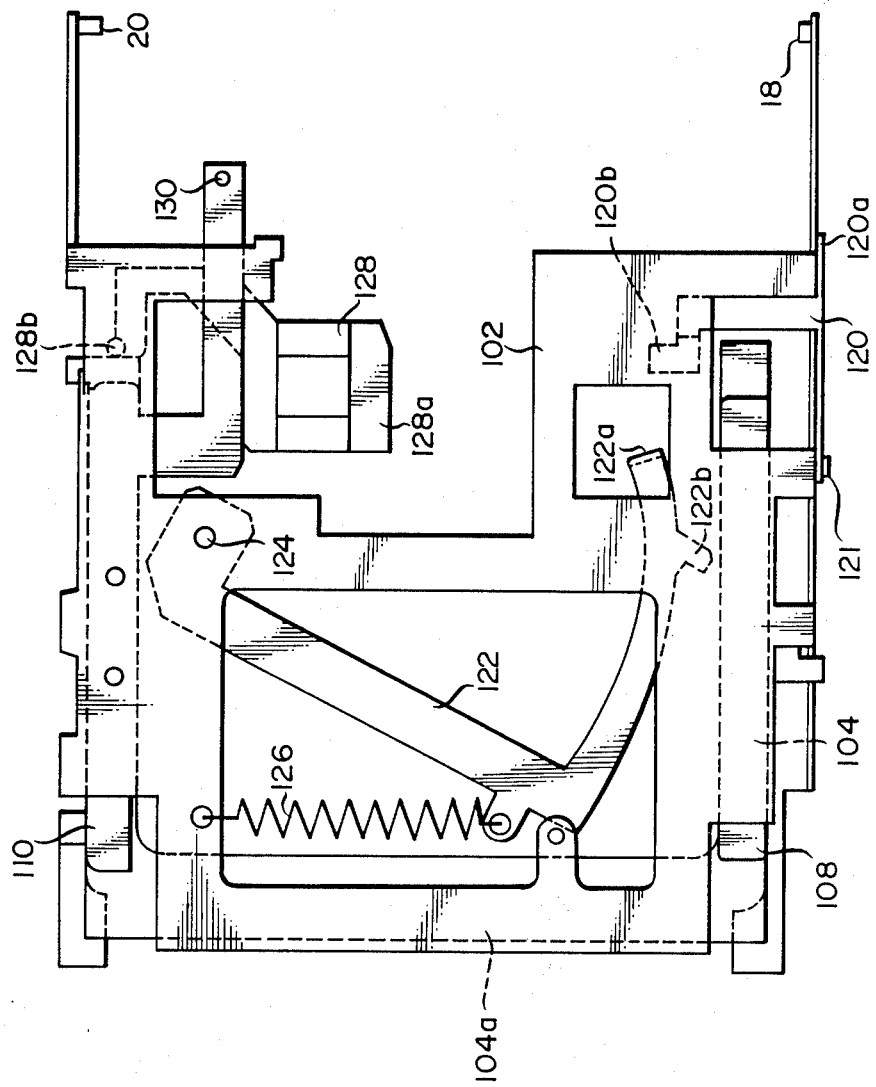

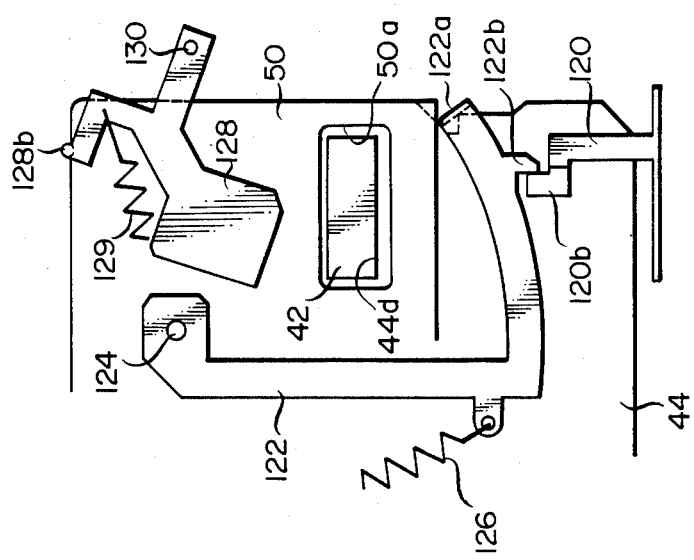
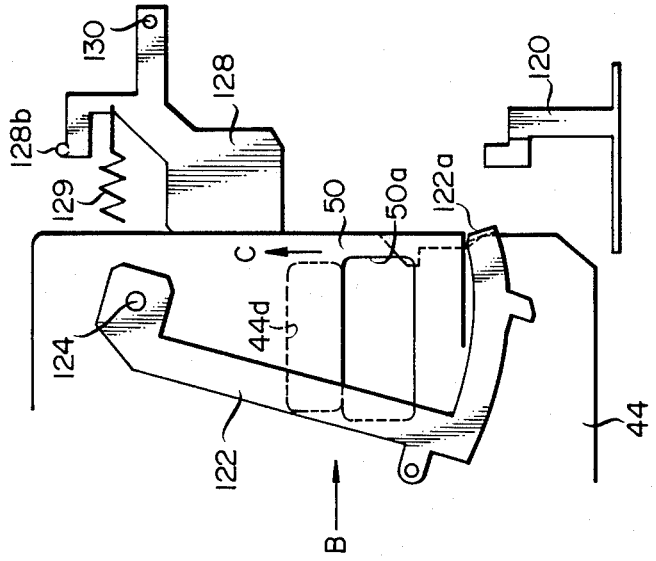

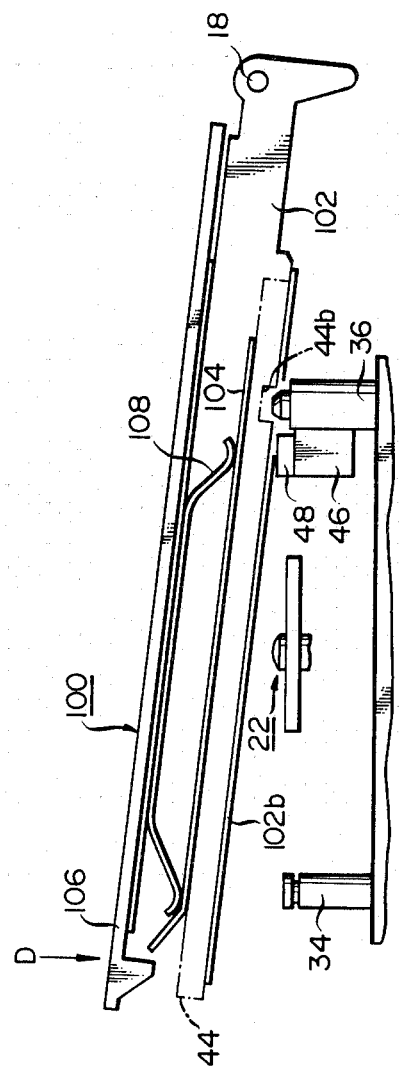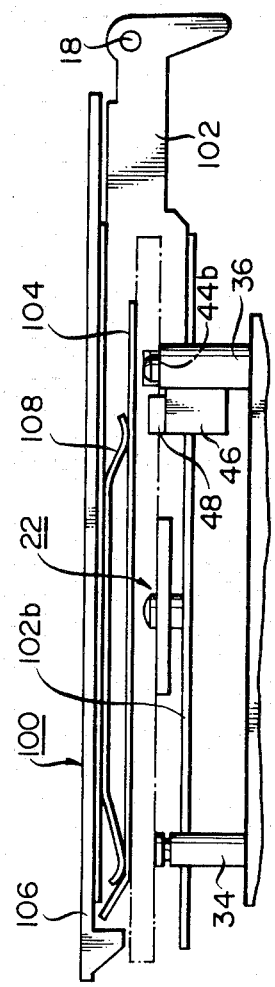

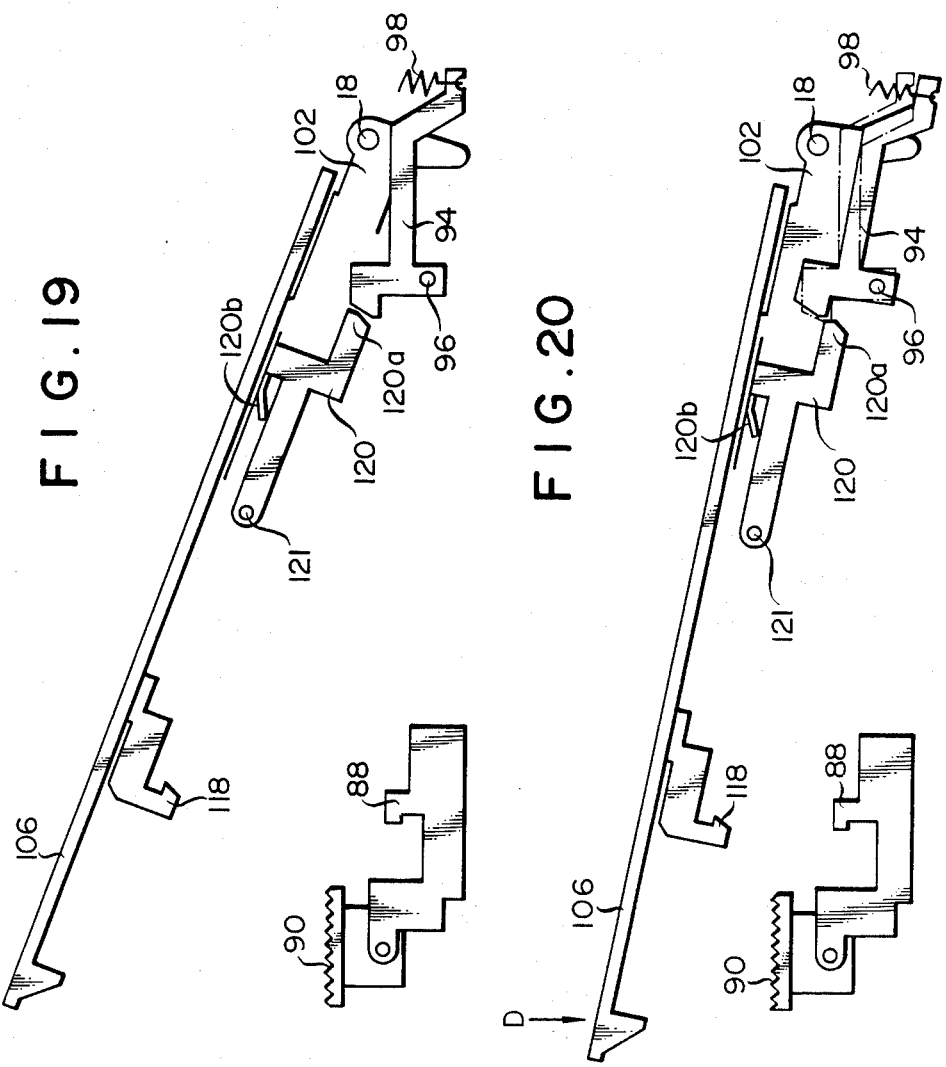

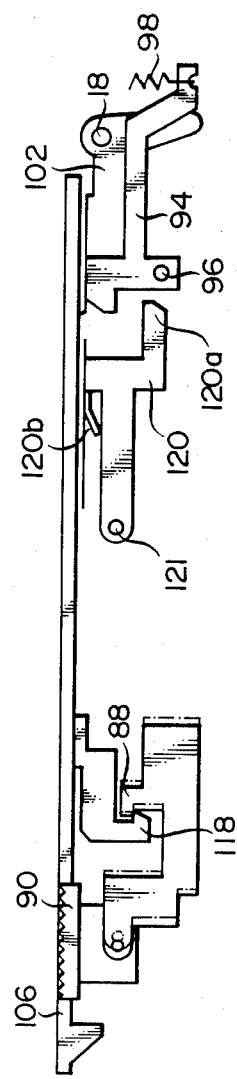
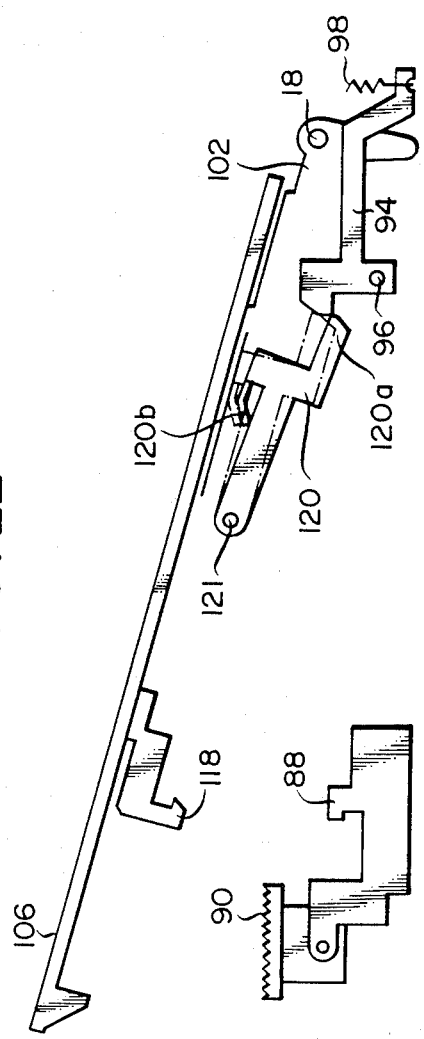

FLOPPY DISK DRIVE HAVING A PIVOTALLY SUPPORTING CARTRIDGE CARRIER

BACKGROUND OF THE INVENTION

1. Field of the Invention

The present invention relates to a floppy disk drive, and particularly to an improved drive for a micro-floppy disk cartridge which contains a floppy disk as an information recording medium.

2. Prior Art

There are known various information recording media used as external memories for computers. Among them, magnetic disks are currently utilized since they are randomly accessible and easily handled. Recently, a so-called floppy disk has been developed which includes a substrate of flexible plastic sheet having one or two faces coated with magnetically storing layers. The floppy disk is increasingly used over the broad range of applications since it has many advantages, for example, in that the floppy disk is cheaper than hard disks and in that the floppy disk can easily be changed to another floppy disk to increase the capacity of memory.

More recently, a so-called cartridge type micro-floppy disk has been developed in which a floppy disk as an information recording medium is contained within a cartridge of hard plastic casing or the like. This is advantageous in that the floppy disk can extremely easily and simply be carried and handled while preventing the recording face(s) thereof from being damaged and contaminated by any foreign matters. Such a micro-floppy disk cartridge is broadly being utilized as an excellent external memory in small-size computers and particularly personal and domestic computers.

In the micro-floppy disk cartridge, the micro-floppy disk is housed within a hard plastic casing which has a shutter mechanism for preventing the READ/WRITE faces of the disk from being exposed to protect the recording faces substantially completely from any foreign matters. Thus, a user can handle the floppy disk without his additional attention to the damage and contamination of the recording faces in the floppy disk. The micro-floppy disk cartridge also is mailable.

In order to most utilize the advantages of the micro-floppy disk cartridge, a floppy disk drive therefor must have various new performances different from those of the conventional 8-inch floppy disk drive. Main requirements to the micro-floppy disk drive is that it can be reduced in size and can be operated with the minimum power consumption.

Computers themselves are remarkably being reduced in size while increasing their processing speed and capacity. It is thus known that the entire size of a computer system depends on the dimension and arrangement of a keyboard, monitor and external memory. Consequently, the micro-floppy disk drive should necessarily be reduced in size and operated with the minimum power consumption such that a portable microcomputer can be realized.

The conventional micro-floppy disk drives comprise mechanisms similar to those of large-sized floppy disk drives. In most of the conventional micro-floppy disk drives, the disk is loaded into the forward loading port of the drive (front loading). In such a construction, the drive must have a passage for the cartridge. This provides a limitation when the size of the drive should be decreased, particularly to obtain a portable type floppy disk drive having a reduced thickness.

Since the floppy disk generally has the opposite WRITE faces, the drive must have two drive heads adapted to contact the opposite faces of the disk.

In such a double-headed floppy disk drive, however, the heads must accurately be positioned relative to each other. If the relative position between two heads is not proper, the READ/WRITE cannot be effected. In general, each of the heads is carried by a carriage or arm and must travel over all the trucks of floppy disk. Therefore, a simple mechanism for adjusting the relative position between the heads which can be assembled into the drive is eagerly desired in the art.

In the micro-floppy disk drive, the disk is adapted to be held between the heads under pressure. The heads are biased toward each other under pressure also when no cartridge is loaded therebetween. This results in damage of the heads.

SUMMARY OF THE INVENTION

In view of the above problems in the prior art, it is therefore an object of the present invention to provide a small-sized floppy disk drive for driving micro-floppy disk cartridges.

Another object of the present invention is to provide an improved mechanism which can finely adjust the relative position between two heads particularly carried by arms.

To achieve the above objects, the present invention provides a floppy disk drive comprising a frame portion including a spindle motor for directly driving a floppy disk, a plurality of positioning pins for positioning the disk cartridge relative to said spindle motor, and a carriage for carrying heads which are adapted to contact said disk for reading/writing information, said carriage being adapted to move the heads to the desired track of said disk, and a carrier swingably supported by said frame portion and adapted to receive the disk cartridge, whereby the cartridge can be inserted into the lower portion of said carrier when the carrier is in its pop-up position and the cartridge can upwardly be moved to a predetermined position within the carrier when the carrier is engaged by said frame portion.

BRIEF DESCRIPTION OF THE DRAWINGS

FIG. 1 is a side view of a preferred embodiment of the floppy disk drive according to the present invention, showing a carrier in its pop-up position;

FIG. 2 is a side view, partially broken, of the drive when a disk is contained in the frame portion and operated by the carrier shown in FIG. 1;

FIG. 3 is a plan view of the frame portion in the embodiment shown in FIG. 1;

FIG. 5 is a sectional view taken along a line V—V in FIG. 3, showing a cartridge detecting switch mechanism;

FIG. 6 is a sectional view taken along a line VI—VI in FIG. 3, showing a write protector mechanism;

FIG. 8 is a plan view, partially broken, of the carrier in its push-out position and a head guard;

FIGS. 9, 10, 11 and 12 illustrate the operation of the mechanism shown in FIG. 8;

FIGS. 13 to 15 are views illustrating the loading of a disk in accordance with the present invention;

FIGS. 19 to 22 are views illustrating the rock and push-out trigger actions of the carrier;

DESCRIPTION OF THE PREFERRED EMBODIMENTS

Figure 4:
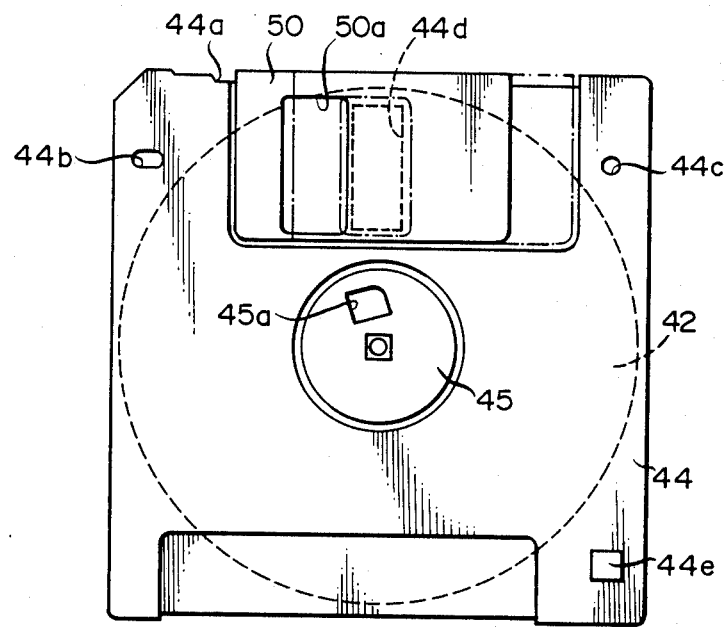
FIG. 4 is a plan view of a micro-floppy disk cartridge used in the present invention.

Preferred embodiments of the present invention will now be described with reference to the drawings.

Referring to FIGS. 1 to 3, there is shown a floppy disk drive according to the present invention which is of a top loading type different from the conventional floppy disk drives.

The floppy disk drive according to the present invention comprises a frame portion which can be assembled into the body of a computer (not shown), and a carrier portion supported at one end by the frame portion for pivoting to a predetermined angle at which a cartridge can be loaded into the carrier. The computer body includes a CUP, a keyboard and a monitor and is connected integrally with the aforementioned floppy disk drive to form a computer system. The computer system is preferably portable such that it can be assembled into an attache case, for example.

Construction of the Frame

The frame portion includes a frame 10 of aluminium die casting or the like. The frame 10 includes a circuit board for driving the apparatus which is mounted on the bottom face thereof in a suitable manner. The circuit board cooperates with a host circuit in the computer to control READ/WRITE relative to the disk. The frame 10 also includes a forward plate 12 and side plates 14 and 16 all of which are fixed thereto. The side plates 14 and 16 fixedly support at their rearward ends carrier shafts 18 and 20, respectively. The carrier is pivotally supported by the carrier shafts 18 and 20 as described hereinafter.

The frame 10 further includes a spindle motor 22 assembled thereinto which comprises a motor shaft 24 supported by the frame 10, a rotor 26 fixedly mounted on the motor shaft 24, and a stator coil 28 fixedly mounted on the frame 10 adjacent to the lower portion of the rotor 26. The rotor 26 is in the form of a multi-pole type magnetic rotor which is adapted to rotate the disk in a given manner when the stator coil 28 is energized by an alternating electric power.

The motor shaft 24 has a drive hub 30 fixedly mounted thereon on which a floppy disk is positioned coaxially to the motor shaft 24 such that the floppy disk can directly be driven by a drive pin 32 on the drive hub 30 as described hereinafter.

The frame 10 further includes four positioning pins 34, 36, 38 and 40 fixedly located thereon the top faces of which serve to position the floppy disk relative to the spindle motor 22.

FIG. 4 shows a cartridge type micro-floppy disk assembly which can be used in the present invention. This assembly includes a cartridge 44 of hard plastic material and a disk 42 rotatably contained within the cartridge 44 and on which information can be recorded. The disk 42 includes a driven hub 45 fixed thereto which will be positioned opposed to the drive hub of the spindle motor 22 so that the drive pin 32 can be inserted into the read groove 45a of the disk 42 for driving the disk.

The cartridge 44 includes head receiving openings 44d formed at the opposite sides therethrough and extending radially in the disk. These openings 44d are used in reading/writing the disk 42. As well known, the head receiving openings 44d are normally closed by a shutter 50 which is slidably mounted within the cartridge 44. When the shutter 50 is moved to its operative position shown by broken line in FIG. 4, the opening 50a therein is aligned with the head receiving openings 44d to expose a portion of the disk 42.

The sliding movement of the shutter 50 is accomplished by operating a shutter lever disposed on the floppy disc drive as described hereinafter. The cartridge 44 includes a groove 44a formed therein for conducting the tip of the shutter lever to a position in which the shutter lever engages the shutter 50. The cartridge 44 also includes positioning recesses 44b and 44c formed therein which are respectively engaged by the positioning pins 36 and 40. The surface of the cartridge 44 also is engaged by the positioning pins 34 and 38. Thus, the cartridge 44 can properly be positioned in place. As well known in the art, however, the micro-floppy disk 42 may finally be positioned by contacting the driven hub 45 with the drive hub 30 of the spindle motor 22 and also engaging the drive pin 32 with the read groove 45a without dependent on the positioning of the cartridge 44 itself. Therefore, the cartridge 44 may temporarily be positioned in such a range of accuracy that the final position of the disk 42 can properly be determined.

To read/write the disk 42 as described above, the frame 10 slidably supports a carriage 46 such that it can be moved radially to the central axis of the spindle motor 22, that is, to the center of the disk 42. The carriage 46 has a read/write head 48 fixedly mounted thereon at the forward end.

The carriage 46 is slidably supported on the frame 10 by two carriage shafts 51 and 52 disposed parallel to each other.

The carriage 46 includes an arm 54 which is pivotally supported by an arm shaft 56. The tip of the arm 54 includes a pad 58 fixedly mounted thereon which cooperates with the head 48 to hold the disk 42 therebetween under a predetermined pressure which can be determined by the force of a spring 60 acting between the head 48 and the pad 58. In the illustrated embodiment, another head may be mounted on the tip of the arm 54 in place of the pad 58 to provide a double-headed drive system. In this disclosure, the term "head pair" which will be used hereinafter includes the set of head and pad and also a set of two heads.

In accordance with the present invention, the carriage 46 having the head 48 and pad 58 is reciprocated along the carriage shafts 51 and 52 by a stepper motor 62 which is fixedly mounted on the frame 10. Upon energization of the stepper motor 62, the carriage 46 and thus the head 48 is steppingly moved on the disk 42 to a desired location in the radial direction in the random access manner. The disk 42 can thus be read or written with respect to the desired track.

In the illustrated embodiment, the carriage 46 is connected with a pulley 64 fixedly mounted on the drive shaft of the stepper motor 62 by means of an α belt 66 which will be described in detail. When the stepper motor 62 is energized, the carriage 46 is reciprocated.

To spring the arm 54 upwardly in the clockwise direction as viewed in FIG. 1 when it is wanted to load the cartridge 44 without interference with the head 48, the frame 10 includes an arm lift lever 68 mounted thereon to pivot about a pin 70. The arm lift lever 68 is biased by means of a spring 72 clockwise as viewed in FIGS. 1 and 2. The arm lift lever 68 has a tongue 68a engaging a carrier cover, which will be described hereinafter, to limit the pivotal movement of the lever 68. On the other hand, the arm 54 includes an arm lift 54a formed therein which will be engaged by the arm lift lever 68 to pivot the arm 54. By having the biasing force of the spring 72 larger than that of the spring 60, the pivotal position of the arm 54 can be controlled by arm lift lever 68 when the arm lift 54a is engaged by the arm lift lever 68. After the arm lift 54a is disengaged by the arm lift lever 68, the arm 54 is urged against the disk 40 under the force of the spring 60.

To detect the head 48 in the track position "0 0" of the disk 42, the rearward end of the carriage 46 includes a light blocking portion 46a which can be detected by means of a photo-interrupter fixedly mounted on the frame at the path along which the light blocking portion 46a is moved. In this manner, the track "0 0" can electrically be detected.

To detect the cartridge 44 when it is properly positioned and held in place, the frame 10 further includes a cartridge detection switch 76 having a contact 80 which is normally engaged by an actuator 78. This actuator 78 is slidably mounted on the positioning pin 34 and upwardly urged by a spring. When the cartridge 44 is loaded to depress the projection 78a of the actuator 78 into a proper position, the contact 80 generates an ON operation signal which serves to supply a predetermined start signal to the control circuit.

As shown in FIG. 6, the frame 10 further includes a write protector 82 which is adapted to inhibit the disk from writing if necessary. The write protector 82 includes an actuator 84 which is slidably supported on the positioning pin 38 and urged upwardly thereon. The write protector 82 also includes a contact 86 which is adapted to be depressed by the actuator 84 into its OFF position to inhibit the disk from writing. More particularly, the actuator 84 is provided with a projection 84a which is received by a hole formed on the cartridge 44 when a write protector section 44e thereon is removed as shown in FIG. 4. At this time, the write protector contact 86 is in its ON condition so that even if the cartridge 44 is loaded into its proper position, a WRITE inhibiting signal can be supplied to the control circuit. On the other hand, if the write protector section 44e is not removed from the cartridge 44, the actuator 84 is moved downwardly to make the write protector contact 86 off to cancel the WRITE inhibition immediately when the cartridge is loaded.

As shown in FIG. 1, a carrier lock lever 88 is mounted on the side plate 14 of the frame portion in such a manner that the lever 88 can slide transversely along the side plate 14. The carrier lock lever 88 is connected with a pop-up button 90. The carrier lock lever 88 is urged leftwardly as viewed in FIG. 1 by a biasing spring 92. When the pop-up button 90 is externally operated, the carrier lock lever 88 is moved rightwardly so that the carrier will be released as described hereinafter.

The side plate 14 also supports a push-out trigger lever 94 pivotably about a pin 96. The push-out trigger lever 94 is adapted to control a push-out lever which is used to remove the loaded cartridge from the carrier as described hereinafter. The push-out trigger lever 94 is normally urged toward its limit position by a spring 98 counter-clockwise as viewed in FIG. 1.

Construction of the Carrier

Figure 7:
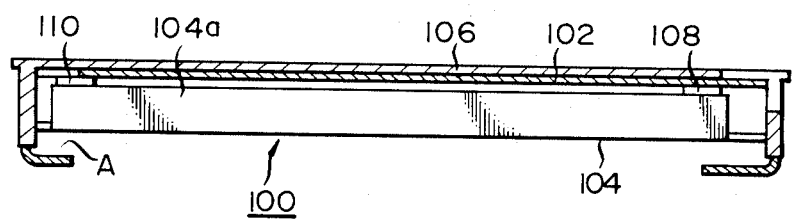
FIG. 7 is a sectional view taken along a line VII—VII in FIG. 1.

Carrier 100 is biased clockwise as viewed in FIG. 1 by means of a pop-up spring (not shown). As shown in FIGS. 1 and 7, the carrier 100 comprises a carrier body 102 pivotably supported by said carrier shafts 18 and 20, a cartridge keeping member 104 disposed inside the carrier body 102, and a carrier cover 106 fixedly mounted on the top of the carrier body 102. The cartridge keeping member 104 is downwardly urged by two leaf springs 108 and 110. To support the cartridge keeping member 104 within the carrier body 102 in such a manner that the member 104 can be moved vertically as viewed in FIG. 7, the cartridge keeping member 104 includes a bearing portion 104b extending outwardly from the side thereof on which a shaft 112 is fixedly mounted. On the other hand, the carrier body 102 includes a shaft 114 fixedly mounted on the side 102a thereof. A link lever 116 is spanned and supported between the shafts 112 and 114. Thus, the cartridge keeping member 104 can be moved parallel to the top face of the carrier body 102 while being downwardly urged by the keeping springs 108 and 110. As shown in FIG. 1, the cartridge 44 can be moved downwardly when it is loaded into the carrier 100. The cartridge keeping member 104 also is provided with a receiving curved portion 104a formed at the tip thereof for facilitating the loading of the cartridge 44 into a cartridge chamber A.

The carrier body 102 further includes a carrier locking pawl 118 disposed at the side thereof which is adapted to engage the carrier lock lever 88 on the frame portion to lock the carrier 100 at its operative position shown in FIG. 2.

The carrier body 102 further includes a push-out trigger 120 mounted thereon at the side in such a manner that the push-out trigger 120 can be pivoted about a shaft 121 through a slight angle. The end 120a of the push-out trigger 120 is adapted to engage the push-out trigger lever 94 while the other end 120b extending inwardly into the carrier body 102 is adapted to engage a push-out described hereinafter.

FIG. 8 shows the carrier 100 with the carrier cover 106 being removed.

The bottom face of the carrier body 102 supports a push-out 122 pivotably about a shaft 124. The push-out 122 is biased clockwise as viewed in FIG. 8 by means of a spring 126.

The push-out 122 includes a downwardly curved portion 122a formed at the tip thereof, which is adapted to be received in a groove 44a of the cartridge 44 as shown in FIG. 4. The curved portion 122a of the push-out 122 can be advanced displacing the shutter 50 to open the head receiving opening 44d.

The push-out 122 further includes a hook portion 122b formed therein which is adapted to engage the trigger end 120b of the push-out trigger 120 to hold the shutter open.

A head guard 128 is pivotably supported about a shaft 130 in the cartridge keeping member 104 and biased counter-clockwise with the guard end 128a thereof being received between the head 48 and the pad 58. As a result, the head 48 can be prevented from being damaged when the cartridge 44 is not loaded. The head guard 128 is provided with a pin 128b. When the cartridge 44 is loaded to expel the pin 128b of the head guard 128, the head guard 128 retracts outside the cartridge.

FIGS. 9 through 12 show the cartridge 44 loaded in the carrier 100 and mainly illustrate the operations of the push-out 122 and head guard 128.

Operations of Push-out and Head Guard

FIG. 9 shows the cartridge 44 when it is inserted into the carrier 100 to its halfway position with the end of the shutter 50 being engaged by the curved portion 122a of the push-out 122.

When the cartridge 44 is further moved inwardly from the position shown in FIG. 9 in the direction of arrow B, the push-out 122 is rotated counter-clockwise about the shaft 124 and at the same time the curved portion 122a thereof causes the shutter 50 to move in the direction of arrow C such that the opening 50a will be opened to the head receiving opening 44d. When the cartridge 44 is further advanced in the direction of arrow B, the right end of the cartridge 44 contacts the pin 128b on the head guard 128 to rotate the head guard 128 clockwise.

FIG. 10 shows the cartridge 44 when it is loaded at a predetermined position. At this time, the curved portion 22a of the push-out 122 completely opens the shutter 50 so that the opening 50a thereof is aligned with the head receiving opening 44d to expose the disk 42. As a result, the head 48 can read or write the disk 42. Since the head guard 128 has been rotated clockwise as shown in FIG. 10, the head can contact the face of the disk 42 without any interference. Such a condition is maintained by the fact the hook portion 122b of the push-out 122 moves beyond the trigger end 120b of the push-out trigger 120 and then engages the right end of the push-out trigger 120. In such a manner, the push-out 122 can hold under the above condition against the clockwise force of spring 126.

As will be described hereinafter, when the carrier 100 is popped up, the push-out trigger 120 is slightly moved downwardly as viewed in FIG. 10. Thus, the push-out 122 is released so that the cartridge 44 will automatically be ejected from the carrier 100 under the action of the spring 126.

As is apparent from the foregoing, the head pair holding the disk 42 therebetween that is, the head and pad 48, 58 in the illustrated embodiment may be utilized in a small-sized floppy disk drive having a top loading mechanism nism such that the head guard can be inserted between the pair of heads to positively prevent the heads from being damaged when the disk cartridge is not loaded. Further, the head guard may positively be retracted to position the head pair at its proper READ/WRITE location when the cartridge is loaded.

Figure 11:
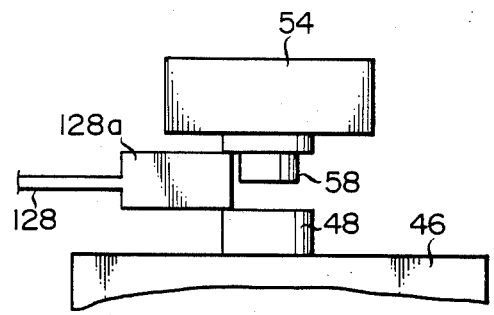

FIG. 11 shows a head guard 128 located between the head pair. No cartridge 44 is inserted into the disk drive so that the head 48 tend to contact the pad 58 under a predetermined pressure. As seeen from the description in connection with FIG. 9, however, the guard end 128a of the head guard 128 is located between the head 48 and the pad 58. Thus, the heads can be prevented from contacting with each other such that wear or damage in the heads can positively be avoided.

Figure 12:
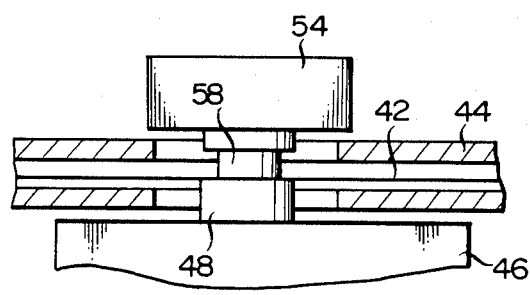

FIG. 12 shows the relationship between the head pair and the disk when the cartridge is loaded as shown in FIG. 10. Under such a condition, the head guard 128 is in its retracted position as described hereinbefore in connection with FIG. 10. Therefore, the disk 42 is held between the head 48 and the pad 58 under a predetermined pressure to enable the desired READ/WRITE.

As seen from FIG. 10, the pin 128b on the head guard 128 is expelled by the cartridge 44 and engaged by the side thereof when the head guard 128 is retracted. As seen from FIG. 10, therefore, the biasing force of the spring against the head guard 128 only contacts the side of the cartridge 44 without movement of the cartridge 44 to push-out after the head guard 128 has once been moved to its retracted position.

In accordance with the present invention, therefore, the cartridge 44 will not be ejected from the carrier 100 under the action of the biasing spring 129 which biases the head guard 128, when the cartridge is loaded and before the same is locked at its predetermined position.

Loading and Unloading of Cartridge

As seen from the aforementioned arrangement, the present invention provides a top loading type floppy disk drive having a small-sized and thin construction by the fact that the carrier 100 can be popped up relative to the frame portion and then receive the cartridge 44 and that the carrier 100 can thereafter be moved into the frame portion to properly position the cartridge 44.

Figure 13:
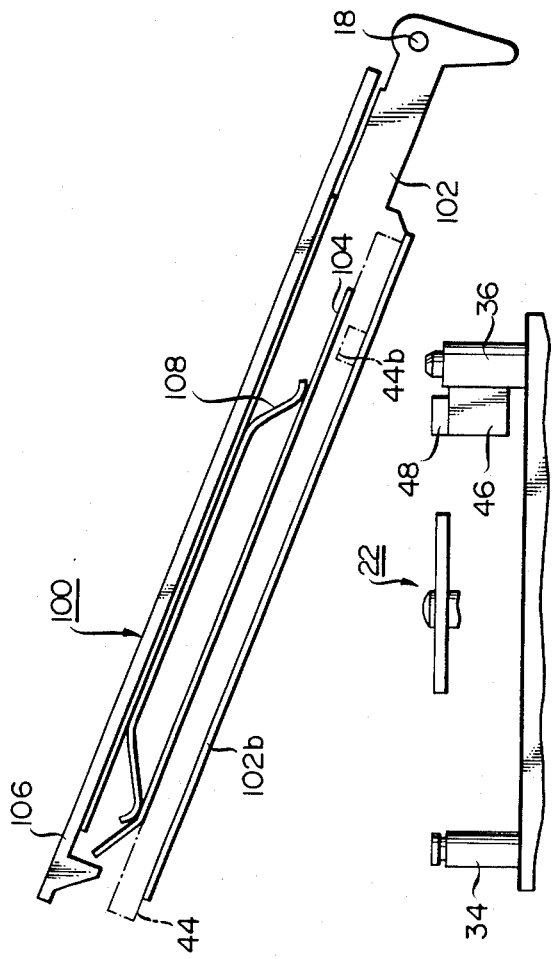
Figure 16:
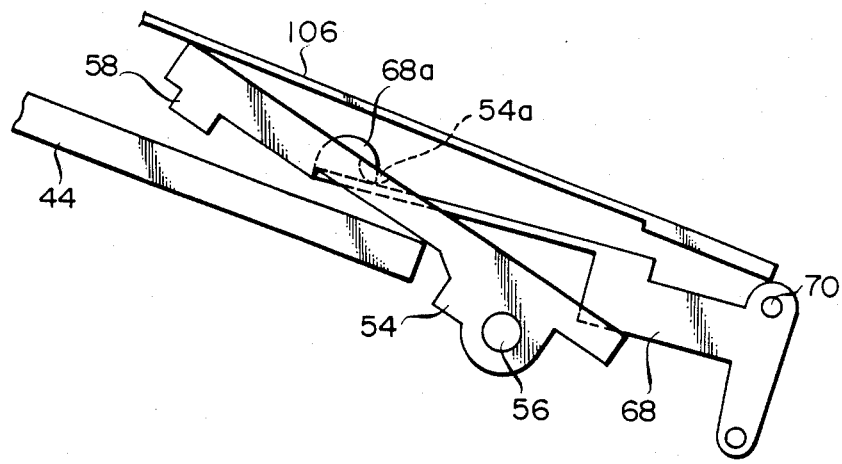
FIGS. 16 to 18 are views illustrating the operation of a swingable arm in accordance with the present invention.
Figure 17:
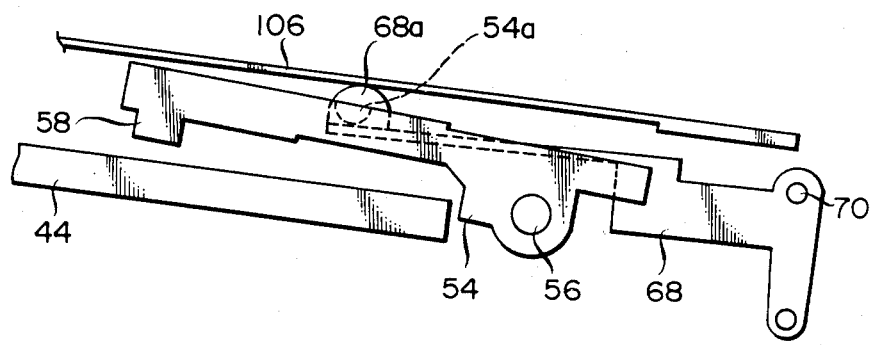
Figure 18:
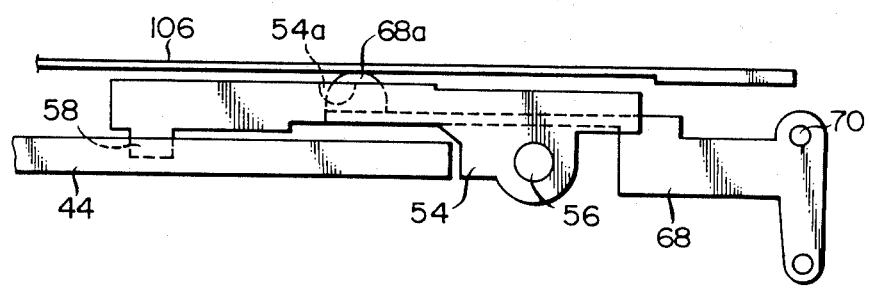

FIGS. 13 through 15 show the loading and unloading of the cartridge 44 while FIGS. 16 through 18 show the escape of the pad 58 (upper head in the double-headed type) due to the arm 54.

FIG. 13 shows the carrier 100 rotated clockwise about the shaft 18 to receive the cartridge 44. Such a condition is maintained by a pop-up spring (not shown).

Where the floppy disk drive according to the present invention is assembled into a small-sized computer, for example, an attache case, the carrier 100 is partially protruded upwardly from the top of the attache case so that the actual loading of the cartridge 44 can extremely be facilitated.

As seen from FIG. 13, the cartridge 44 is inserted in the carrier 100 such that the cartridge 44 lifts the cartridge keeping member 104 slightly upwardly against the force of the keeping spring 108. Under such a condition, the cartridge 44 is held between the cartridge keeping member 104 and the bottom face 102b of the carrier body 102.

As seen in FIG. 16, at this time, the arm lift 54a of the arm 54 is pivotally biased clockwise by means of an arm lift lever 68. The tip of the arm 54 is thus engaged and positioned by the carrier cover. Consequently, even when the cartridge 44 is loaded, the pad 58 (or upper head) will not be engaged by the cartridge 44 to damage the head or cartridge.

FIG. 14 shows the carrier 100 when it is moved inwardly into the frame portion in the direction of arrow D. In FIG. 14, the cartridge positioning recess 44b is shown to be contacting the positioning pin 36. Subsequently to the position shown in FIG. 14, the cartridge 44 is moved relative to the upper half of the carrier 100 by means of the positioning pin 36 and the bottom of the cartridge 44 is gradually separated from the bottom 102b of the carrier 100.

As shown in FIG. 17 substantially corresponding to FIG. 14, the pad 58 is still separated from the cartridge 44. However, the tongue 68a of the arm lift lever 68 is moved counter-clockwise by the carrier cover 106 so that the arm lift lever 68 will gradually be separated from the arm lift 54a.

FIG. 15 shows the carrier 100 when it is completely loaded in the frame portion. In such a position, the cartridge 44 is completely moved to the upper half of the carrier 100 by means of the positioning pins 34 and 36. Subsequently, the spindle motor 22 is energized to drive the disk in the cartridge. As seen from FIG. 15, the carrier 100 has a thickness sufficiently larger than that of the cartridge 44. Thus, a sufficient opening can be provided to receive the cartridge 44 when the carrier 100 is in its pop-up position. In accordance with the present invention, furthermore, the cartridge 44 may be moved from the lower half to the upper half of the carrier 100 when the latter is being moved into the frame portion. Thus, the upper half space of the carrier 100 can more effectively be utilized. In the position shown in FIG. 15, of course, the lower half of the carrier 100 serves to receive the spindle motor 22 or the head 48.

FIG. 18 shows the operational position of the cartridge 44 in which the arm lift lever 68 is sufficiently pivoted counter-clockwise by means of the carrier cover 106 away from the arm lift 54a. The pad 58 (upper head) on the arm 54 is thus moved counter-clockwise under its own biasing force such that the disk can be held between the pad and the head under a predetermined pressure.

FIGS. 19 through 22 illustrate a function for locking the carrier against the frame portion and another function for pushing the cartridge 44 outwardly.

FIG. 19 shows the carrier 100 in its pop-up position in which the carrier locking lever 88 on the frame portion and in which the push-out trigger 120 also is separated from the push-out trigger lever 94 on the frame portion.

FIG. 20 shows the carrier 100 when it receives the cartridge and then moved inwardly into the frame portion. In the halfway position in which the carrier is being moved about the shaft 18 in the direction of arrow D, the push-out trigger 120 slightly contacts the lever 94 which is in turn retracted from a position shown by broken line to a position shown by solid line against the action of the spring 98. This permits the push-out trigger 120 to easily pass through the position in which the push-out trigger 120 contacts the lever 94. The push-out trigger 120 would otherwise be inhibited from rotating counter-clockwise about the shaft 122. Due to this passage of the push-out trigger 120 through the above position, the apparatus can be set for a cartridge push-out action which will be described hereinafter.

FIG. 21 shows the carrier when it has been inserted in the frame portion. Under such a condition, the carrier lock lever 88 is expelled to a position shown by broken line in FIG. 21 by means of the carrier lock pawl 118 establish a locking relationship therebetween. Even if an external force applied to the carrier is removed, the carrier can positively be positioned and contained in the frame portion.

FIG. 22 shows the cartridge when it is being removed out of the carrier. When the button 90 is moved rightwardly as viewed in FIG. 22 to disengage the carrier lock pawl 118 with the carrier lock lever 88, the carrier is popped up clockwise under the action of the pop-up spring.

On popping-up of the carrier, if the cartridge 44 is early pushed out of the carrier, the front face of the cartridge 44 may impact, for example, the forward plate 12 in the frame portion to be damaged. In the illustrated embodiment, this problem can be solved by the fact that the cartridge can be pushed out of the carrier only when the carrier 100 is rotated to a predetermined angular position to eliminate any probability of impact with the forward plate 12 or others.

FIG. 22 illustrates a timing when the cartridge is pushed out of the carrier. When the carrier is rotated clockwise, the tip 120a of the push-out trigger 120 is engaged by the pawl portion of the push-out trigger lever 94 at the position shown in FIG. 14. Under such a condition, the lever 94 is forced clockwise. Since the lever 94 is prevented from rotating clockwise, however, the trigger 120 is slightly rotated clockwise about the shaft 121 as shown by solid line. This slight rotation of the trigger 120 causes the trigger end 120b thereof to move downwardly relative to the carrier 100. As seen from the description in connection with FIG. 10, the downward movement of the trigger end 120b releases the hook portion 122b of the push-out 122 so that the cartridge 44 can be ejected from the carrier under the action of the spring 126.

In accordance with the present invention, the cartridge can extremely readily be loaded into the carrier since an opening in the carrier is sufficient to receive the cartridge. When the carrier is contained within the frame, the floppy disc drive can be of a very small-sized and compact construction. To remove the cartridge from the apparatus, the button 90 can easily and simply be operated.

Carriage Traveling Mechanism

To travel the carrier 46 until the head thereon reaches the desired track on the disk, the illustrated embodiment utilizes the stepper motor 62 as described hereinbefore. A mechanism for converting the rotational drive of the stepper motor 62 into the reciprocation of the carriage 46 will now be described with reference to FIGS. 23 through 26.

In accordance with the present invention, the travel of the carriage can be achieved by utilizing an α belt which is spanned along the carriage with part of the belt being fixed to a pulley. This provides a positive travel of the carriage in a limited space.

Figure 23:
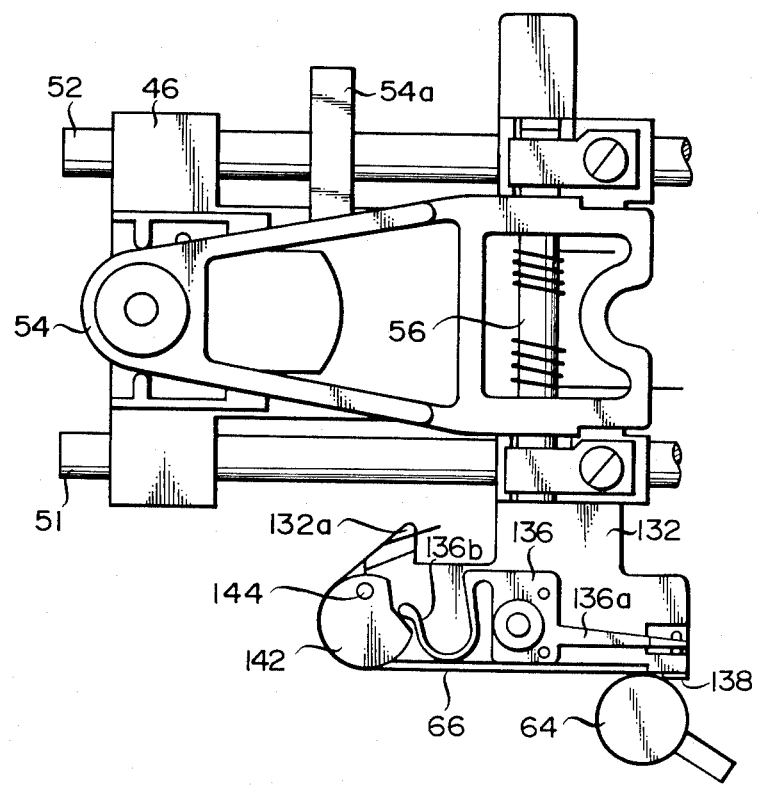
FIG. 23 is a plan view of a cartridge conveying mechanism.

In FIG. 23, the carriage 46 includes a belt receiving portion 132 formed therein, the opposite ends of which are connected respectively with the corresponding ends of the α belt 66.

Figure 24:
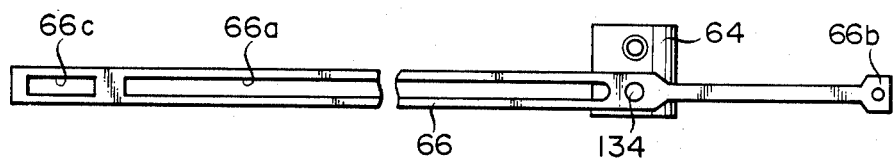
FIG. 24 is a front elevational view of an α belt for conveying the carriage.
Figure 25:
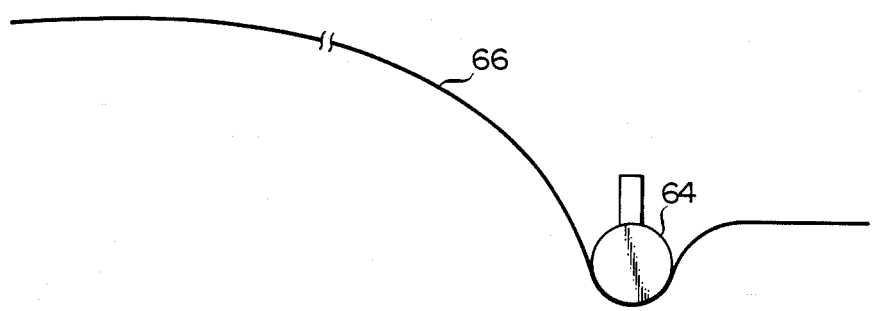
FIG. 25 is a plan view of the α belt.

The α belt 66 is connected with a pulley 64 by means of a fastening pin 134 at a position intermediate between the opposite ends of the belt as shown in FIGS. 24 and 25. The α belt 66 is reduced in width from the above position in one direction. The α belt 66 has a widened portion extending from the intermediate portion thereof in the opposite direction. This widened portion of the belt 66 includes a groove 66a formed therein and extending centrally along the length of the belt. The α belt 66 is wound around the pulley 64 by freely passing the reduced portion through the groove 66a in the widened portion. When the pulley 64 is rotated in one direction, the α belt 66 is unwound from the pulley 64. When the pulley 64 is rotated in the opposite direction, the α belt 66 is wound about the pulley 64.

Figure 26:
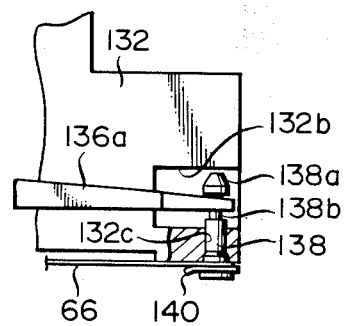
FIG. 26 is a plan view showing, in an enlarged scale, a mechanims for supporting the end of the α belt shown in FIG. 23.

The α belt 66 is fixed at one end 66b to the right-hand end of the belt receiving portion 132 by an anchoring mechanism shown in FIG. 26. The other end of the belt 66 is hooked by an anchor pawl 132a formed on the belt receiving portion 132 at the other end so that the α belt 66 can be connected with the carriage 46.

FIG. 26 shows a structure in which the end 66b of the α belt 66 can easily and simply be connected with the belt receiving portion 132. In such a structure, a belt supporting spring 136 is fixed to the belt receiving portion 132. The belt supporting spring 136 includes an anchor spring portion 136a formed therein at one end. The tip of the anchor spring portion 136a is engaged by a lock pin 138 fixed to the α belt 66 at one end. The lock pin 138 is fixedly attached to the one end of the α belt 66 through a washer 140 by any suitable manner such as caulking or the like. The lock pin 138 includes a tapered tip portion 138a and a neck portion 138b joined to the tapered tip 138a. On the other hand, the belt receiving portion 132 includes a cavity 132b and an aperture 132c extending to the cavity 132b through the wall of the belt receiving portion 132. The lock pin 138 extends through said aperture 132c.

As seen from FIG. 26, the tip portion of the lock pin 138 extending through the aperture 132c protrudes into the cavity 132b. The neck portion 138b is engaged by the tip of the anchoring spring portion 136a to bias the lock pin 138 upwardly as viewed in FIG. 26. As a result, the one end of the α belt 66 is firmly connected with the belt receiving portion 132. The α belt 66 may be removed from the belt receiving portion 132 simply by lifting the anchoring spring portion 136a without any additional tool.

The other end of the α belt 66 may be anchored simply by hooking the hooking groove 66c thereof to the anchor pawl 132a. Under such a condition, however, the α belt 66 will loosely be connected with the carriage 46. As a result, the reciprocation of the pulley 64 cannot be effected with the desired accuracy.

In the illstrated embodiment, the α belt 66 can properly be spanned over the carriage 46 by applying a biasing force to the belt 66 after it has been connected with the belt receiving portion 132. For this purpose, a biasing cam 142 is swingably supported on the belt receiving portion 132 by means of a shaft 144. The biasing cam 142 receives a biasing force from a biasing spring 136b which is located on the belt supporting spring 136 at the opposite end. Thus, the biasing cam 142 always applies a force to the belt 66 such that it will be opened outwardly. Therefore, the belt 66 can always be tensioned to a predetermined level after assembled.

In such an arrangement, the α belt 66 or carriage 46 may effectively be accommodated with respect to any possible error due to changed temperatures, passage of time or the like.

In a double-headed floppy disc drive including two upper and lower heads which are respectively mounted on carriage and arm, the upper and lower heads must always be maintained at a properly relative position therebetween. The present invention also provides a mechanism which can fulfull such a requirement.

Figure 27:
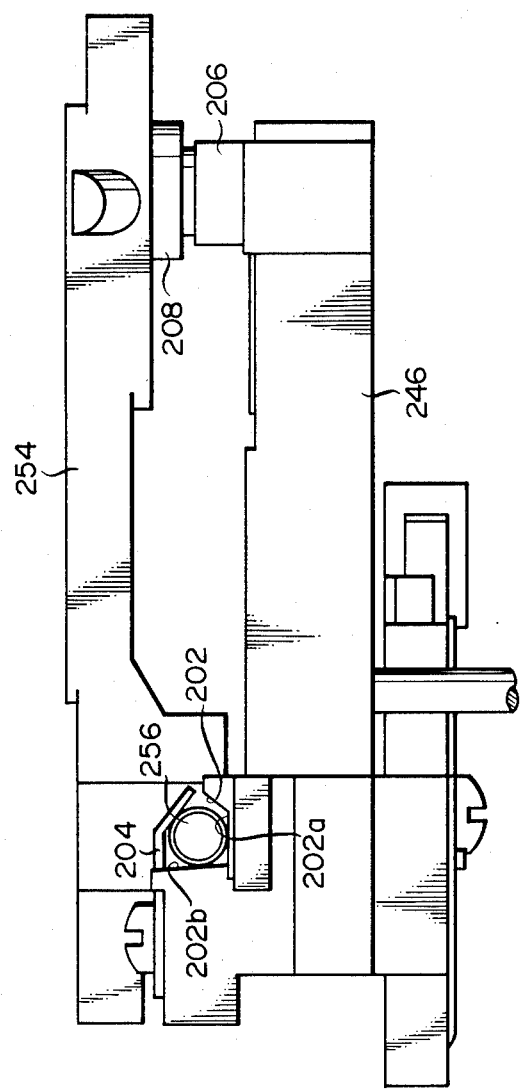
FIG. 27 is a side view showing, in an enlarged scale, a head positioning mechanism which is another embodiment of the present invention.

FIG. 27 shows a carriage 246 and an arm 254 in an enlarged scale for illustrating such a mechanism. The arm 254 includes an arm shaft 256 fixed thereto which is properly positioned relative to the carriage 246 by the above mechanism.

More particularly, the carriage 246 is provided with a L-shaped groove 202 for receiving the arm shaft 256. The arm shaft 256 is engaged by the bottom and side walls 202a and 202b of the groove 202 such that the arm shaft 256 will be positioned at its proper position.

To ensure these engagements of the arm shaft 202 with the bottom and side walls 202a, 202b, the arm shaft 256 is biased at the opposite ends by means of a leaf spring 204 which is screwed to the carriage 246 as shown in FIG. 27. Thus, the arm shaft 256 can properly be positioned within the L-shaped groove 202. Since the groove 202 is of L-shape in accordance with the present invention, the arm shaft 256 can finely be adjusted to the desired position.

Figure 28:
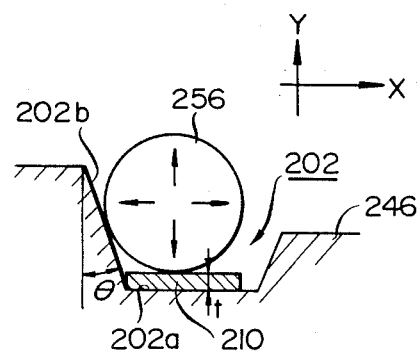
FIG. 28 illustrates the operation of the mechanism shown in FIG. 27.

FIG. 28 shows the relationship between the arm shaft 256 and the L-shaped groove 202 in an enlarged scale. In accordance with the present invention, the side wall 202b of the L-shaped groove 202 is sloped with a positive angle $\theta$. By providing the sloped side wall 202b, the position of the arm shaft 256 in the direction X can be changed depending on the position at which the arm shaft 256 contacts the side wall 202b. The change of the arm shaft 256 in the direction X causes the lower head 206 to displace relative to the upper head 208. Furthermore, the upper head 209 may finely be adjusted relative to the lower head 206 by independently regulating the opposite ends of the arm shaft 256 in the direction X.

In the illustrated embodiment, the displacement of the arm shaft 256 in the direction X, that is, in the position at which the arm shaft 256 contacts the side wall 202b may be changed by inserting a spacer 210 having any thickness t between the arm shaft 256 and the bottom wall 202a. This causes the arm shaft 256 to move in the direction Y as well as the direction X. Thus, by using spacers having different thicknesses or by changing the number of used spacers, the arm shaft can extremely easily be adjusted in the direction X with a higher accuracy. Furthermore, by providing the side wall 202b having a relatively small sloping angle $\theta$, a further fine adjustment can be carried out. Although the slope of the side wall 202b is positive in the illustrated embodiment, the slope may be opposite or negative.

We claim:

1. A floppy disk drive comprising a frame portion including a spindle motor for directly driving a floppy disk, a plurality of positioning pins for positioning a disk cartridge containing said floppy disk relative to said spindle motor and a carriage carrying a head used to read/write by contacting said floppy disk and which is adapted to travel said head to the desired track on said floppy disk, a carrier pivotally supported by said frame portion to be pivotally movable between a closed position and a popped-up position and adapted to receive said disk cartridge, the arrangement being such that said disk cartridge is inserted into a lower portion of said carrier when said carrier is in said popped-up position and that said disk cartridge is moved upwardly within said carrier when said carrier is engaged by said frame, and a head arm on said frame portion and arm lift level pivotally mounted on said frame portion for retracting said head arm when said disk cartridge is loaded, and wherein said arm lift lever is biased away from said frame by means of a spring, said arm lift lever being adapted to pop said arm upwardly when said arm lift lever engages an arm lift for said arm.

2. A floppy disk drive as defined in claim 1 wherein said arm lift lever engages said carrier cover at a tip thereof and wherein the upward movement of said arm lift lever is limited by said carrier cover.

* * * * *